United States Patent Office 2,734,426
Patented Feb. 14, 1956

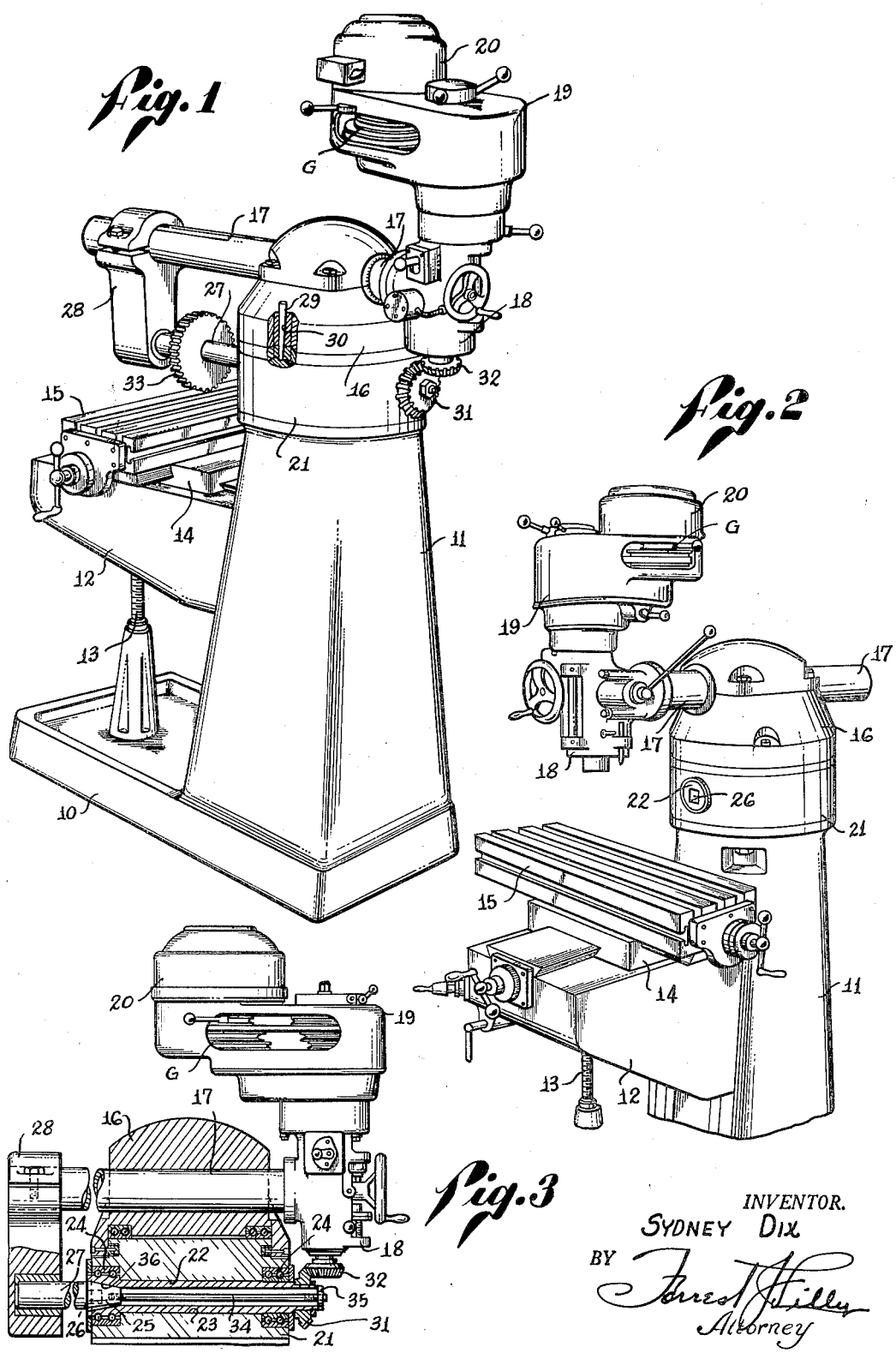

2,734,426

MILLING MACHINE

Sydney Dix, Los Angeles, Calif.

Application February 8, 1954, Serial No. 408,700

2 Claims. (Cl. 90—11)

This invention relates to milling machines and more particularly to a combination horizontal and vertical milling machine.

Combination milling machines capable of both vertical and horizontal milling operations are well known in the art. Usually these machines comprise a conventional vertical spindle with associated gear reduction and motor driving means, and a conventional horizontal spindle with associated gear reduction and motor driving means, all supported by a single column. While the provision of a common base and column for supporting the separate vertical and horizontal spindles respectively, results in some economy of space, these combination machines are still relatively bulky and expensive to manufacture. Further, the maintenance of such a machine is about the same as would be necessary for maintaining separate vertical and horizontal milling machines.

The primary object of the present invention is to provide a greatly improved combination vertical and horizontal milling machine which is of substantially the same size and bulk as a single conventional type vertical milling machine.

More particularly, it is an object of the invention to provide an attachment to convert a conventional vertical milling machine to a combination vertical and horizontal milling machine which is not appreciably greater in cost nor requires appreciably more maintenance than a conventional vertical milling machine.

Still another object of the invention is to provide a combination horizontal and vertical milling machine by the simple addition of a novel structure to a conventional type vertical milling machine, enabling the same to operate as a horizontal milling machine without any change in or sacrifice of its normal vertical operating characteristics.

These and further objects and advantages of the present invention are attained by providing a horizontal spindle housing adapted to be secured to a conventional type vertical milling machine. The turret structure of the conventional vertical milling machine is modified somewhat whereby the overarm of the vertical spindle and the spindle itself may be rotated 180°. The horizontal spindle is journalled in the spindle housing to pass substantially diametrically through the center of the column whereby the vertical spindle will be positioned over the rear end of the horizontal spindle when swung about 180°. Suitable transmission means are provided on the rear end of the horizontal spindle and coupled to the vertical spindle whereby the drive motor and reduction gearing normally employed for driving the vertical spindle will serve to drive the horizontal spindle through this transmission means.

The free or rear end of the overarm is adapted to support an arbor when the vertical spindle turret is in the 180° position so that an arbor and cutting tool may be operated by the horizontal spindle. The conventional table is capable of motion in both vertical and horizontal planes and therefore, the work may be properly positioned under the horizontal cutting tool for purposes of horizontal milling. The need for flexibility in the horizontal spindle such as is characteristic of the vertical spindle is accordingly, not essential.

A better understanding of the invention and its various features will be had by referring to the accompanying drawings, in which:

Fig. 1 is a general perspective view of a milling machine of the present invention in position for a horizontal milling operation;

Fig. 2 is another perspective view of a portion of the milling machine shown in Fig. 1, when in position for normal vertical milling operations; and, Fig. 3 is an elevation view, partly in section, of the horizontal spindle housing and turret structure of the milling machine shown in Figs. 1 and 2.

Referring to Figs. 1 and 2, there is shown a milling machine comprising a base 10 and upwardly extending column 11. A knee 12 vertically movable by means of a jack screw 13 supports a saddle 14 slidably mounting a cross feed table 15, all as is well known in the art.

At the upper end of the column 11 there is provided a turret structure 16 supporting an overarm 17. The overarm 17 is mounted for longitudinal horizontal sliding motion with respect to the turret 16. To one end portion of the overarm 17 there is supported the conventional vertical type spindle head 18, speed reduction means G within a housing 19, and a vertical spindle drive motor 20. The speed reduction means G is capable of different operative connections between the motor 20 and vertical spindle whereby various speeds for the vertical spindle are available.

In accordance with the present invention, there is provided between the column 11 and the turret structure 16, a horizontal spindle housing 21 journalling a horizontal spindle shaft 22 as indicated more clearly in Fig. 2.

Referring particularly to Fig. 3, it will be seen that the horizontal spindle 22 is mounted in a bore 23 extending diametrically through the center portion of the turret housing 21. Suitable ball bearing means 24 journal the spindle 22 in this bore.

One end of the horizontal spindle 22 is provided with a fitting 25 have a square bore 26 adapted to receive a suitable arbor 27. Arbor 27 is adapted to be supported at its other end by an arbor support 28 secured to the rear end of the overarm 17 as shown in Fig. 1.

In order to convert the usual vertical milling machine as shown in Fig. 2, to this arrangement, the vertical spindle on turret structure 16 is rotated from normal operating position, 180° to assume the position shown in Fig. 1. To insure that the overarm 17 will be properly alined and maintained in parallel relation with the horizontal spindle when in the 180° position, a tapered pin 29 may be provided in the turret and dropped in a mating recess 30 in the horizontal spindle housing 21, to lock the turret against rotation with respect to the housing.

With the vertical spindle and overarm 17 in the position as shown in Fig. 1, it will be noted that the spindle head is positioned over the rear end of the horizontal spindle. This rear end portion of the spindle 22 is provided with a bevel gear 31 adapted to mesh with a second bevel gear 32 secured to the vertical spindle.

Normally, the overarm 17 will be pushed through the turret structure 16 as far as possible to provide an elongated rear end portion for supporting the arbor support 28. The spindle head 18 is then lowered until the bevel gear 32 is in proper meshing engagement with the bevel gear 31. The gear 32 is then backed off slightly from the bevel gear 31 to provide proper working clearance. The locking pin 30 insures that the turret will remain in its set position.

Because of the universal movement of the table 15, any of the usual horizontal milling operations may be readily affected with the structure as described, since the work may be properly positioned under a milling tool 33 by proper adjustment of the knee, saddle, and table.

Referring once again to Fig. 3, the horizontal spindle may comprise a hollow tube within which there is coaxially positioned a tie rod 34 engaging the fitting 25 at one end and secured at its other end by a fastening means 35 to the rear end of the spindle 22. With this arrangement it is a simple matter to change the fitting 25 without having to remove the horizontal spindle.

Thus, if it is desired to fit a different type of arbor not adapted to cooperate with the square bore 26 and the fitting 25, the fastening means 35 is backed off to loosen the tie rod 34. The fitting 25 is then removed from the front end of the tie rod and a new fitting inserted therein. The fastening means 35 is then tightened up to tension the tie rod 34 and pull the new fitting into the front end of the tubular spindle 22. It will be noted that the internal end portion of the spindle tube 22 is flared as at 36. The new fittings to be inserted are provided with conical surfaces adapted to mate with the flared portion 36. The arrangement is such that on tightening of the tie rod 34, the new fitting will be properly centered with respect to the axis of the horizontal spindle.

When it is desired to do a vertical milling operation, the turret structure 16 may simply be rotated back into normal operating position after having removed pin 30 and the arbor support 28. The bevel gear 32 is then removed from the vertical spindle and a suitable vertical milling tool inserted. As mentioned above, this normal operating position of the milling machine is illustrated in the perspective view of Fig. 2.

It will be appreciated at once from the above description that the only addition to a conventional vertical milling machine necessary to provide a combination machine is the modified turret structure and horizontal spindle housing 21. These modifications, as described above, permit the vertical spindle drive motor 20 and speed reduction means G to be employed for driving the horizontal spindle.

Usually horizontal milling operations require a lower cutter speed than vertical milling operations. Therefore, it may be desirable to effect a further speed reduction at the transmission drive between the vertical and horizontal spindles. This may be accomplished by making bevel gear 32 of lesser diameter than bevel gear 31 as shown. It is to be noted of course that in addition to such speed reduction effected through the bevel gears, the usual speed reduction means in the housing 19 for the vertical spindle will also be effective for changing the speed of the horizontal spindle when the milling machine is set up for horizontal milling operations.

The present invention provides accordingly, a combination horizontal and vertical milling machine which may be produced without any appreciably greater cost than a conventional type vertical milling machine. In fact, a conventional type of vertical milling machine may be very easily modified to be capable of horizontal milling operations by simply embodying, in the vertical milling machine, the present invention.

Various modifications within the scope and spirit of the present invention will occur to those skilled in the art. The combination vertical and horizontal milling machine is therfeore not to be thought of as limited to the specific embodiment chosen for illustrative purposes.

I claim:

1. In a milling machine, a base having an upstanding column, a work table on said base at one side of said column, a horizontal spindle journaled in said base column on a horizontal axis extending over said work table, a turret mounted on the upper end of said column for rotation thereon about a vertical axis, an overarm extending horizontally from said turret, a vertical spindle journaled on said overarm on a vertical axis laterally offset from said column on the side thereof opposite said work table, drive means mounted on said overarm for rotating said vertical spindle, means for drivingly connecting the end of said horizontal spindle adjacent the work table coaxially to one end of a milling tool arbor, transmission means drivingly connecting the lower end of said vertical spindle to the end of said horizontal spindle remote from said work table for horizontal milling, said transmission means comprising members at least one of which is fixed to said horizontal spindle and another one of which is carried on the lower end of said vertical spindle, and means removably securing said other member to the vertical spindle whereby said other member may be removed from said vertical spindle, said turret may be rotated through 180 degrees to position said vertical spindle over said work table, and a milling tool may be secured to the lower end of said vertical spindle, in place of said member, for vertical milling.

2. The subject matter of claim 1 wherein said members comprise gears.

References Cited in the file of this patent

UNITED STATES PATENTS

| | | |
|---|---|---|
| 1,269,727 | Metz | June 18, 1918 |
| 2,349,004 | Richards | May 16, 1944 |